UNITED STATES PATENT OFFICE.

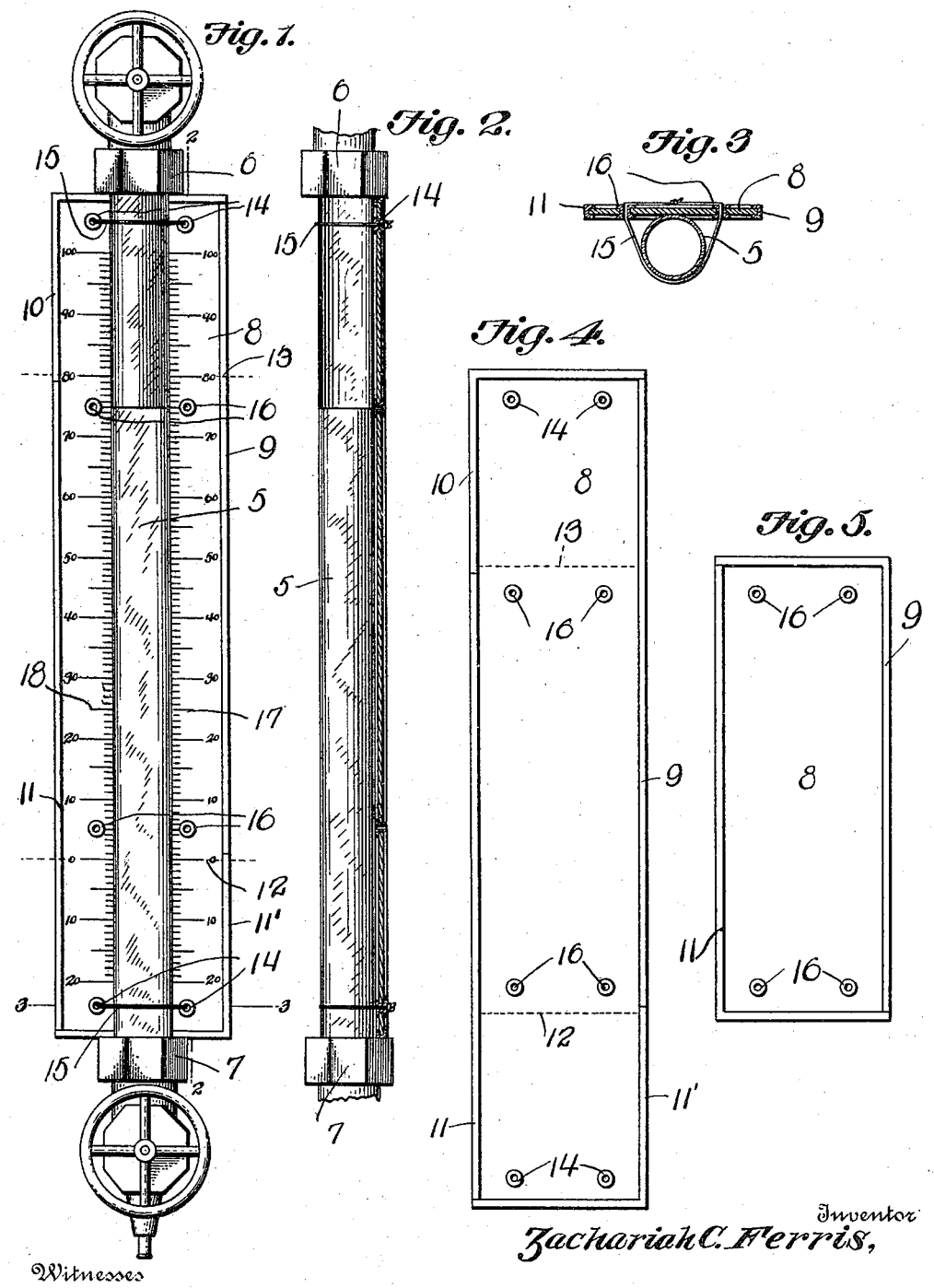

ZACHARIAH C. FERRIS, OF CALDOR, CALIFORNIA.

WATER-GAGE ATTACHMENT.

966,323.  Specification of Letters Patent.  Patented Aug. 2, 1910.

Application filed January 14, 1910. Serial No. 538,059.

*To all whom it may concern:*

Be it known that I, ZACHARIAH C. FERRIS, a native-born citizen of the United States, residing at Caldor, in the county of Eldorado and State of California, have invented new and useful Improvements in Water-Gage Attachments, of which the following is a specification.

This invention relates to improvements in water gage attachments and has for one of its objects the provision of a panel or sheet of any suitable material one face of which is coated with a light unglazed color. The sheet or panel is then secured behind the gage glass of a boiler with its light colored surface bearing on or arranged adjacent to the glass and in such position that when the glass is partly filled with water the light will pass through that portion of the glass and liquid making the white background stand out distinctly. On the other portion of the glass however, or that filled with air or steam and above the level of the water an entirely different result is produced, since it can be seen that all the light falling upon this portion of the glass cannot, according to the general law of total reflection pass through the glass, whereby the panel or sheet will be indistinct and a portion of the surface of the glass will reflect the light falling thereon while the sides of the glass will present a dark opaque appearance. By virtue of the darkness and the narrow strip of light a sharp clear demarcation is produced between the two substances within the glass.

Another object of the invention is the provision of a sheet or panel the length of which may be changed in order to conform to the various lengths of gage glasses.

A further object is the provision of a sheet or panel provided with a graduated scale by means of which the height of the water column in the boiler may be read in inches.

With these and other objects in view, which will more fully hereinafter appear, the present invention consists in certain novel details of construction and arrangement of parts, hereinafter fully described, illustrated in the accompanying drawings and more particularly pointed out in the appended claims; it being understood that various changes in the form, proportion, size, and minor details of the device may be made, within the scope of the appended claim, without departing from the spirit or sacrificing any of the advantages of the invention.

In the accompanying drawings, forming a part of the specification;—Figure 1 is a front elevation of the device showing its application to an ordinary tubular gage glass. Fig. 2 is a longitudinal sectional view on the line 2—2 of Fig. 1. Fig. 3 is a sectional plan view on the line 3—3 of Fig. 1. Fig. 4 is a detail front elevation of the sheet or panel before the scale is marked thereon. Fig. 5 is a similar view and showing the panel after the length of the same has been diminished in order to be applied to a comparatively short gage glass.

Similar numerals of reference are employed to designate corresponding parts throughout.

The gage glass is designated by the numeral 5 and its opposite ends are secured in a pair of sockets 6 and 7, which form portions of the valves which establish communication between the glass and interior of the boiler. Since these parts form no part of the subject matter of the present invention a detail description of the same is not given.

In carrying out the invention I provide a strip or panel 8 preferably formed of an oblong piece of cardboard or the like. The marginal edges of the strip or panel 8 are covered by metallic strips 9, 10, 11 and 11'. The strips 9, 10 and 11 are preferably of thin sheet brass or analogous metal and are channeled so as to receive the edges of the sheet or panel 8 and after receiving the said edges may be crimped so as to be fixedly secured to the said sheet or panel. As shown in Figs. 1, 2 and 4 the length of the strip or panel 8 corresponds approximately to that portion of the gage glass 5 exposed between the sockets 6 and 7. Since it is well known that these gage glasses are not of standard length, in forming the strip 8 I make it sufficiently large to be applied, as shown in Figs. 1 and 2 to the largest form of gage glasses in ordinary use. When the strip is to be applied however to a gage glass less in length than that shown in Figs. 1 and 2 the strip and its edge coverings may be diminished in length in the following manner:—By reference now to Fig. 4 it will be seen that at points between the horizontal center and opposite ends the sheet or panel 8 is provided with transverse indentations 12 and 13 which will permit the strip when it is bent at these lines to be neatly severed, whereby its length will be diminished. Referring again now to Fig. 4 it will be seen that the strip 10 covers one end of the sheet or panel and a portion of one of its longitudinal sides extending to the transverse line of indentations 13. Thus it can be seen when the upper end portion of the sheet or panel is to be removed the strip 10 may be readily detached therefrom and after the said upper end is removed that portion of the strip 9 on the opposite longitudinal side of the sheet or panel, projecting in advance of the sheet, after the latter has been severed, may be bent at right angles so as to bear on the upper end of the sheet as shown in Fig. 5. When it is desired to further decrease the length of the sheet or panel 8 the lower end portion may be removed in a similar manner by first removing the strip 11' corresponding to the strip 10 after which the lower end portion of the strip 11 arranged on that longitudinal side of the sheet opposite to the strip 9 may be bent over the lower edge of the sheet and crimped thereto as shown in Fig. 5.

In order that the sheet or panel may be securely fixed to the glass 5 I provide the sheet or panel adjacent to its opposite ends, and on either side of its longitudinal center with a pair of transverse openings in which are fitted eyelets 14. These eyelets receive lengths of wire 15, which straddle the upper and lower end portions of the gage glass and have their terminals twisted at the middle of the rear side of the sheet or panel 8 as clearly shown in Figs. 2 and 3. A similar fastening means is provided after the length of the sheet has been decreased, since it can be seen by reference to Fig. 4 that adjacent to the transverse indentations and in alinement with the eyelets 14 similar eyelets 16 are provided.

The longitudinal central portion of the sheet between the eyelets 14 and 16 is coated with a light unglazed color, the width of said coated portion corresponding approximately to the diameter of an ordinary gage glass. The portions of the sheet or panel arranged between its opposite longitudinal sides and the central coated portion are divided into linear scales 17 and 18 as clearly shown in Fig. 1. As the markings of these scales are preferably in red so that the height of the water column may be read according to the graduations of the scales in inches or points it will be observed, owing to the tubular gage glass that that portion of the sheet or panel visible through the water will be magnified and by virtue of this magnification and the refraction the sheet will appear to be close to the outer side of the glass and to extend approximately half way around the glass and in bold contrast to the upper portion of the glass.

Thus it can be seen that I have provided a device which is comparatively simple in structure and inexpensive in manufacture, and which may be adapted to most forms of water gage glasses now in use.

I claim:—

A water gage glass attachment comprising an oblong sheet provided at distances from its opposite ends, equal to the width of the sheet with rows of transverse indentations and having one of its flat surfaces coated with a light color, a pair of angular-shaped channeled strips flanking the opposite ends and portions of the opposite sides of said sheet and extending to points approximately in alinement with the adjacent rows of indentations, and a second pair of channeled strips arranged on the opposite longitudinal sides of said sheet and having their inner ends bearing on the extremities of the first-named strips in alinement with the indentations and their outer ends bearing on the opposite or outer extremities of the first-named strips, the outer end portions of the second-named strips being bendable over opposite ends of the sheet after the portions of the latter in advance of the indentations together with the first-named strips have been removed.

In testimony whereof I affix my signature in presence of two witnesses.

ZACHARIAH C. FERRIS.

Witnesses:
E. D. WEEKS,
CRITTENDEN HAMPTON.